Figure 1:
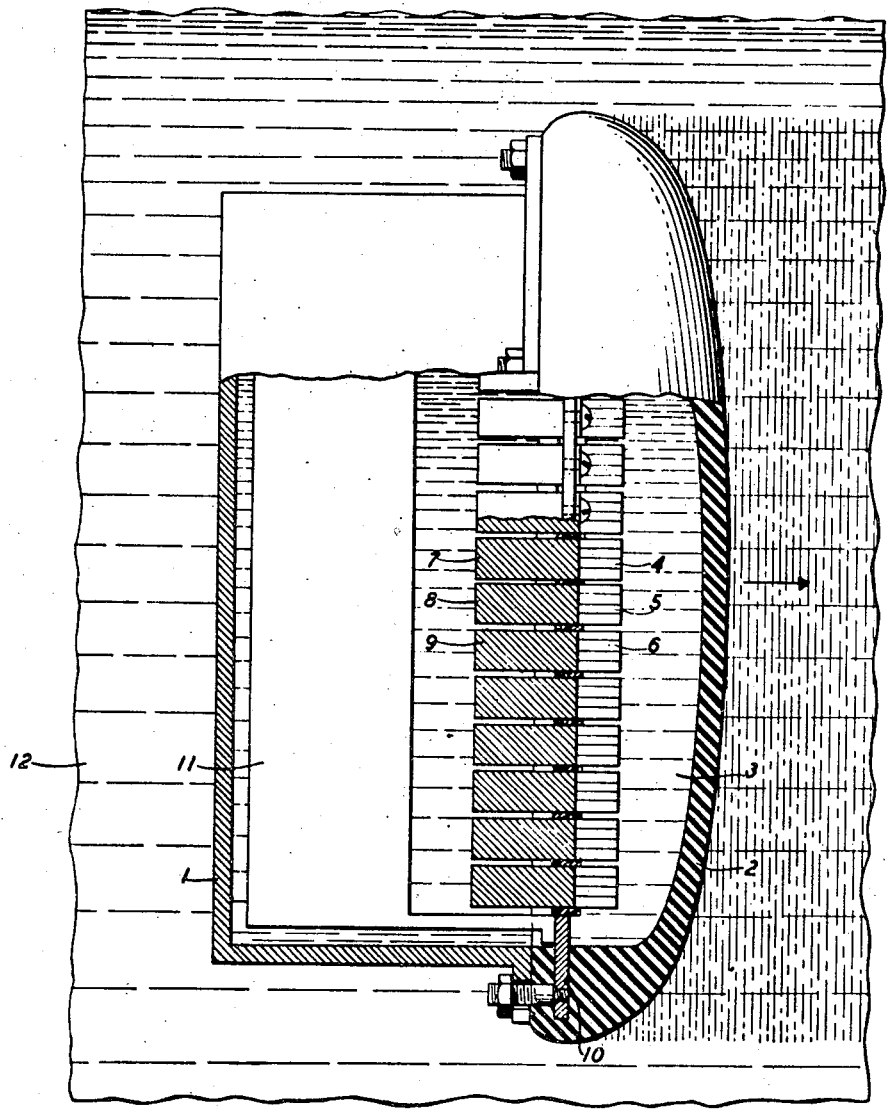

Sept. 10, 1946. W. P. MASON 2,407,315
LIQUID MEDIUM FOR ULTRASONIC COMPRESSIONAL WAVE TRANSMISSION
Filed Oct. 6, 1943 2 Sheets-Sheet 1

INVENTOR
W. P. MASON
BY
John A. Hall
ATTORNEY

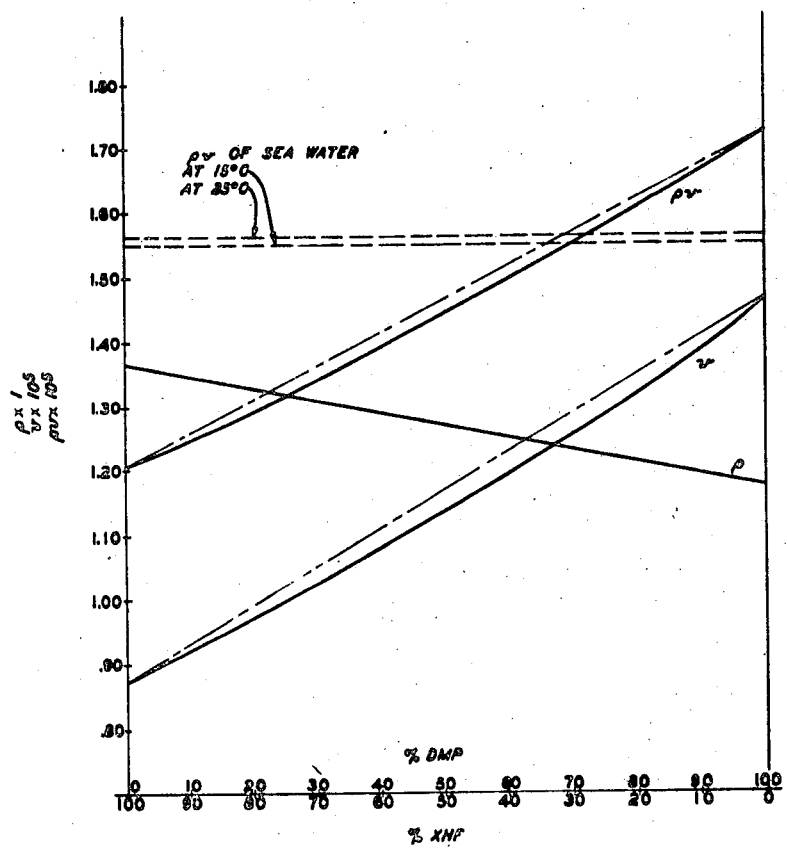

Patented Sept. 10, 1946

2,407,315

UNITED STATES PATENT OFFICE 2,407,315

LIQUID MEDIUM FOR ULTRASONIC COMPRESSIONAL WAVE TRANSMISSION

Warren P. Mason, West Orange, N. J., assignor to Bell Telephone Laboratories, Incorporated, New York, N. Y., a corporation of New York Application October 6, 1943, Serial No. 505,158

2 Claims. (Cl. 252—1)

This invention relates to ultrasonic compressional wave transmission and has for its object the discovery and use of a medium which will support the transmission of high power.

It has been shown that the phenomenon of cavitation imposes a limit on the amount of power which may be transmitted by a transducer, the transducers provided having a capability of transmitting far greater power than can be supported by the surrounding medium.

One form of transducer in common use consists of an array of piezoelectric crystals which respond to electrical excitation to produce compressional waves in a surrounding medium such as sea water; but it has been found that sea water will not transmit a great concentration of power before the phenomenon of cavitation sets in and imposes a practical limit thereto and it has also been found that besides limiting the power which may be transmitted, that cavitation leads to rapid physical destruction of the transducer.

Some advance in the means to transmit greater power has been made by immersing the transducers in another liquid which will support a greater power than sea water and then interposing between such surrounding liquid and the sea water in diaphragm having a much greater area than the effective area of the faces of the transducers so that the power transmitted thereby per unit of area is comparatively small. In this way the total power transmitted may be greatly increased. However, even in this case, the power transmitted by the transducer has to be limited a reasonable amount below the point at which cavitation will begin so as to avoid destruction of the transducer should the power be momentarily raised above the danger point.

It is a specific object of the present invention to provide means whereby the power which the liquid medium in contact with the transducer will support may be transmitted freely and whereby the transducer may be operated without destruction even after cavitation has been established.

Investigation has shown that when an object is moved in a liquid in such a way as to put a tensile strain on the liquid, if the movement is of sufficient rapidity voids are torn in the liquid. When these voids collapse the movement of the liquid has acquired a certain momentum which leads to great and destructive forces being brought to bear on anything in the path of such movement. It has further been found that this phenomenon of cavitation starts somewhat more readily and has less destructive effect in a liquid in which a considerable amount of gas has been dissolved. Whereas in such a liquid, gaseous bubbles may easily be formed, as by agitation, the bubbles so formed are easily expanded by the forces which establish cavitation but are filled with vapor of the liquid or the dissolved gas and consequently do not collapse with such great force as would a void approaching a vacuum. Hence a transducer in such a liquid is not subject to such rapid destruction as it would be if operated in a non-gaseous liquid. But the gaseous turbulence set up in such a gaseous liquid has just as limiting an effect as true cavitation on the transmission of power.

One means for increasing the power that may be transmitted through a liquid medium is therefore to use a non-gaseous or a degassed liquid.

It has further been found that the cohesive force which is related to the tensile strength of the liquid is the chief factor which determines the amount of power the liquid will transmit before cavitation sets in. It is, therefore, desirable to employ a liquid which has a high cohesive force.

Applicant has discovered that a great amount of power may be transmitted by employing a liquid which is non-gaseous, has a high cohesive force and in addition has a high vapor pressure. This last factor is one which causes the liquid to act in the same manner as a gaseous liquid for due to the high vapor pressure voids torn in such liquid are filled with vapor of the liquid and hence do not collapse with the destructive effect of voids which more nearly approach a vacuum. Therefore, given a liquid medium which will support a large power transmission before cavitation sets in, it may be employed up to the limit because like the turbulence set up in a gaseous liquid the cavitation here set up is robbed of its destructive power through its high vapor pressure and hence if the limit is overstepped the transducer will not be immediately ruined.

It can be said in general that as the cohesive force of various liquids increases, the vapor pressure thereof decreases. A feature of the present invention therefore is a liquid characterized both by a high cohesive force and a high vapor pressure.

While the above is a primary requirement, there are other qualities which such a liquid must have. It must have a very high electrical resistance so that no effective electrical connections will be made thereover between electrodes which are immersed therein. It must have low viscosity to avoid heating at the crystal face through the violent mechanical agitation of the liquid thereat. It must have a mechanical impedance equal to sea water and it must not physically or chemically affect the devices and parts with which it comes in contact.

Applicant has discovered that a mixture of dimethyl phthalate and xylene hexafluoride most nearly fulfills all of these requirements.

Dimethyl phthalate, hereinafter referred to as DMP, is a derivative of benzene and an ester of phthalic acid having the chemical formula $C_6H_4(COOCH_3)_2$. This liquid ranks among the highest in its cohesive force and at the same time has a low viscosity. It has a low vapor pressure.

Xylene hexafluoride, hereinafter referred to as XHF, is another derivative of benzene and has the chemical formula $C_6H_4(CF_3)_2$. While it has a low cohesive force it has a very high vapor pressure and a low viscosity. Generally speaking these liquids having a high vapor pressure are good solvents and have a highly corrosive effect on the rubber which is used as a diaphragm. XHF is peculiar in this respect that while it has a high vapor pressure it nevertheless has a high inertness to the materials with which it will come in contact.

The mixture of DMP and XHF has a cohesive force between those of the two components but retains the high vapor pressure of the XHF. Through proper proportioning of the two components it will provide an exact match in mechanical impedance to sea water. The mixture also has the low viscosity of the two components.

Another feature of the invention is a mixture of DMP and XHF in proportions to provide an exact mechanical impedance match to sea water.

Other features will appear hereinafter.

The drawings consist of two sheets having two figures as follows:

Fig. 1 is a side view, partly in section, of an electromechanical transducer in which the liquid medium of the present invention may be employed; and Fig. 2 is a graphical representation of certain properties of various mixtures DMP and XHF.

The electromechanical transducer shown in Fig. 1 comprises a casing 1 of steel or other rigid and mechanically strong material and a cap 2 of plastic material such as that known as $\rho c$ rubber. These two elements are bolted together to form a sealed chamber housing the electrical apparatus and filled with a liquid medium 3 such as a mixture of dimethyl phthalate and xylene hexafluoride. The electrical apparatus consists of a plurality of piezoelectric crystal mosaics such as 4, 5 and 6, each with its resonator 7, 8 and 9 respectively mounted on a plate 10. Within a housing 11, also attached to the mounting plate 10, there is contained other electrical apparatus such as filters and delay networks used when such a transducer is connected as a prism array. The device is shown as submerged in water 12 and the vertical broken lines to the right of the $\rho c$ rubber cap represent a compressional wave as being transmitted.

The graphs of Fig. 2 represent the values of $\rho$ the density, $v$ the velocity and $\rho v$ the acoustic impedance of various mixtures of DMP and XHF. Horizontal lines at values between 1.5 and 1.6 represent the $\rho v$ values of sea water so it will be seen that DMP has a higher $\rho v$ value and XHF has a lower $\rho v$ value than sea water. It will be noted that the density of the mixtures lies accurately on a straight line between the terminal values. The basis for this relationship is given by the formula $$\rho = X\rho_1 + (1-X)\rho_2$$

where $\rho_1$ and $\rho_2$ are the densities of the two components, $X$ is the proportion of the first component and $(1-X)$ that of the second. For this mixture of DMP and XHF this relation is quite accurate when used for the density but not for the velocity and impedance. The next plausible assumption is that sound travels through the liquid as if it went first through all of one pure component the rest of a given distance. This leads to the relation for the velocity.

$$v = \frac{v_1 v_2}{Xv_2 + (1-X)v_1}$$

Applying this relation to the present components gives an over-connection. Actually, the experimental points, from which the graph for $v$ were plotted, lie closely half-way between these two empirical relations, the line for $v$ in Fig. 2 representing the equation $$v = \frac{1}{2}\frac{v_1 v_2}{Xv_2 + (1-X)v_1} + \frac{1}{2}[Xv_1 + (1-X)v_2]$$

From this relation and the values for $\rho$ was derived the line for $\rho v$.

This chart may be used to determine the volume proportions required to give any acoustic impedance within the range of the components. For instance, the values of $\rho v$ for sea water at 25° C. and at 15° C. are shown by dotted lines on the chart. The curve for $\rho v$ of the mixture shows that for the mixture at 25° C. to match sea water at 25° C., the components should be 73 per cent DMP and 27 per cent XHF. For the mixture to simulate sea water at 15° C. the components should be 66 per cent DMP and 34 per cent XHF. Finally for a mixture to match sea water when both are at 15° C. the rough temperature correction of three parts per thousand per degree may be used. The impedance of the mixture should thus be about $1.504 \times 10^5$ ohm/cm.$^2$ at 25° C. in order to become $1.549 \times 10^5$ at 15° C. and the proportions shown by the chart are 62 per cent DMP and 38 per cent XHF.

The method pointed out by the above example may be used in determining the proper proportions of other mixtures of other liquids when the acoustic impedance of sea water is to be matched. The following table gives the acoustic properties of a number of liquids at one megacycle and the temperature at which these properties were measured is noted for the purpose of making temperature corrections.

of DMP and three parts of XHF being somewhere midway between the two.

While other oils and mixtures have higher cavitation pressures (directly related to the cohesive force) other properties prevent their use.

As a further guide to the selection of a liquid medium a third table listing the general range

*Table 1*

| Liquid | Formula | Density $\rho$ in g/cc. | Velocity $v$ in m/sec. | Temperature coefficient $-\Delta v/°C$. | Mechanical impedance $\rho v \times 10^5$ in ohms/cm.$^2$ | Temperature in °C. |
|---|---|---|---|---|---|---|
| Ethylene chloride | | 1.073 | 1,610 | | 1.730 | 25 |
| Sea water | | 1.025 | 1,531 | −2.4 | 1.569 | 25 |
| Do | | 1.027 | 1,507 | −2.4 | 1.548 | 15 |
| Alpha methyl napthalene | $C_{10}H_7CH_3$ | 1.090 | 1,510 | 3.7 | 1.495 | 25 |
| Distilled water | $H_2O$ | .998 | 1,498 | −2.4 | 1.495 | 25 |
| Fuel oil—99 grav | | .990 | 1,485 | 3.7 | 1.472 | 25 |
| Castor oil D B | | .969 | 1,477 | 3.6 | 1.430 | 25 |
| Linseed oil | | .921 | 1,468 | | 1.353 | 24 |
| Peanut oil | | .936 | 1,458 | | 1.363 | 25 |
| Corn oil | | .914 | 1,463 | | 1.333 | 24 |
| Cottonseed oil | | .912 | 1,462 | | 1.330 | 24 |
| Dimethyl phthalate | $C_6H_4(COOCH_3)_2$ | 1.176 | 1,463 | | 1.722 | 25 |
| Mineral oil | | .868 | 1,456 | | 1.263 | 24 |
| Acetylated castor oil—P8 | | .956 | 1,451 | | 1.363 | 25.5 |
| Neat's-foot oil | | .908 | 1,454 | | 1.321 | 24 |
| Sperm oil | | .88 | 1,440 | | 1.268 | 25 |
| Olive oil | | .912 | 1,431 | | 1.308 | 25 |
| Diethyl phthalate | $C_6H_4(COOC_2H_5)_2$ | 1.104 | 1,426 | | 1.574 | 24 |
| Chlorinated diphenyl | | 1.155 | 1,424 | | 1.645 | 24 |
| Decalin | $C_{10}H_{18}$ | .8765 | 1,419 | | 1.245 | 24.3 |
| Dibutyl phthalate | $C_6H_4(COOC_4H_9)_2$ | 1.032 | 1,408 | | 1.455 | 25 |
| Tricresyl phosphate | | 1.153 | 1,406 | | 1.620 | 24 |
| Do | | 1.158 | 1,406 | | 1.630 | 24 |
| Diacetone alcohol | $CH_3COCH_2C(CH_3OH)_2$ | .910 | 1,406 | | 1.280 | 24 |
| Diethyl benzene | $C_6H_4(C_2H_5)_2$ | .854 | 1,348 | | 1.150 | 24 |
| Kerosene | | .810 | 1,324 | | 1.072 | 25 |
| Pentanediol | $(CH_3)_2COHCH_3$ | .913 | 1,304 | | 1.192 | 24 |
| 1-2-4 trichlor-benzene | $C_6H_3Cl_3$ | 1.441 | 1,283 | | 1.849 | 24 |
| Carbon tetrachloride | $CCl_4$ | 1.595 | 926 | 2.7 | 1.478 | 25 |
| Xylene hexafluoride | $C_6H_4(CF_3)_2$ | 1.370 | 879 | | 1.205 | 25 |
| DB+DMP (equal parts of castor oil D B and dimethyl-phthalate) | | 1.080 | 1,468 | | 1.585 | 26 |

From this table various mixtures may be produced whose impedance will match that of sea water. Providing other properties of the liquids meet given requirements, the proportions of the liquids to be used may thus be readily determined.

For the purposes hereinabove set forth in order to provide a liquid which has a high cavitation pressure the following values have been determined and are herein set forth in:

*Table 2*

| Liquid | Pressure on the face of the crystal against the liquid— expressed in atmospheres per cent |
|---|---|
| Olive oil | 7.5 |
| DB (castor oil) | 6.7 |
| P8 (acetylated castor oil) | 6.5 |
| DMP | 6.5 |
| 85% DMP+15% DB | 6.1 |
| Peanut oil | 5.3 |
| Corn oil | 5.2 |
| 85% DMP+15% P8 | 5.2 |
| Sperm oil | 5.0 |
| 4 parts DMP+3 parts XHF | 4.4 |
| Soy bean oil | 4.2 |
| Linseed oil | 4.0 |
| Cottonseed oil | 3.9 |
| 3 parts DMP+1 part DB | 3.9 |
| Carbon tetrachloride | 3.7 |
| Kerosene | 3.4 |
| α Methyl naphthalene | 2.8 |
| Xylene hexafluoride | 2.6 |

From this table it will be seen that dimethyl phthalate ranks among the highest in cavitation pressures and that xylene hexafluoride is the lowest here recorded, the mixture of four parts of viscosity and vapor pressures is here given. In the column of viscosity the figures represent viscosity ranges as follows:

1. Carbon tetrachloride
2. Kerosene
3. Olive oil
4. Castor oil

In the column of vapor pressures the letters represent vapor pressure ranges of the following orders:

A. 1 cm. Hg or more
B. .1 cm. Hg
C. .01 cm. Hg
D. .001 cm. Hg

*Table 3*

| Liquid | Viscosity | Vapor pressure | $\rho v \times 10^4$ | $v$ | $\rho$ |
|---|---|---|---|---|---|
| Castor oil (DB) | 4 | C | 1.43 | 1.477 | 0.969 |
| Acetylated castor oil (P8) | 4 | C | 1.387 | 1.451 | .956 |
| Olive oil | 3 | B | 1.308 | 1.431 | .912 |
| Corn oil | 3 | B | 1.333 | 1.463 | .914 |
| Peanut oil | 3 | B | 1.363 | 1.458 | .936 |
| Soy bean oil | 3 | B | 1.362 | 1.461 | .919 |
| Cottonseed oil | 3 | B | 1.333 | 1.463 | .912 |
| Linseed oil | 3 | B | 1.353 | 1.468 | .921 |
| Sperm oil | 3 | B | 1.268 | 1.440 | .88 |
| Kerosene | 3 | B | 1.022 | 1.324 | .81 |
| α Methyl naphthalene | 1 | A | 1.643 | 1.510 | 1.090 |
| Dimethyl phthalate | 2½ | D | 1.722 | 1.463 | 1.176 |
| Xylene hexafluoride | 1 | A | 1.205 | .879 | 1.37 |
| Carbon tetrachloride | 1 | A | 1.595 | .926 | 1.595 |

On the basis of the above table it appears that α methyl naphthalene and carbon tetrachloride are both suitable from the standpoint of high vapor pressure but it will be noted that both of these liquids have too high a mechanical impedance ($\rho v$) for mixture with DMP to provide a match with sea water and in addition both will attack rubber.

It therefore appears that the mixture of dimethyl phthalate and xylene hexafluoride is a peculiar and novel combination of liquids producing a liquid medium for electromechanical transducers and other like apparatus having the greatest combination of desirable properties.

What is claimed is:

1. A mixture of 57 per cent by volume of dimethyl phthalate and 43 per cent by volume of xylene hexafluoride.

2. In a mixture of liquids having high cohesive force to support large power transmission and high vapor pressure to reduce the destructive effect of cavitation, the combination of dimethyl phthalate and xylene hexafluoride in substantially the proportions of four volumes of dimethyl phthalate and three volumes of xylene hexafluoride.

WARREN P. MASON.